United States Patent [19]

New

[11] Patent Number: 5,083,053
[45] Date of Patent: Jan. 21, 1992

[54] HIGH-FRICTION BACK-UP BEARING FOR MAGNETIC BEARINGS

[75] Inventor: Nigel H. New, Harrow, United Kingdom

[73] Assignee: The Glacier Metal Company Limited, Great Britain

[21] Appl. No.: 558,497

[22] Filed: Jul. 27, 1990

[30] Foreign Application Priority Data

Aug. 4, 1989 [GB] United Kingdom ............ 8917875

[51] Int. Cl.⁵ .................. H02K 5/16; F16C 39/06
[52] U.S. Cl. ...................... 310/90.5; 384/278; 384/913; 310/64
[58] Field of Search .......... 310/64, 74, 90, 90.5; 384/278, 317, 900, 907.1, 913

[56] References Cited

U.S. PATENT DOCUMENTS

| | | | |
|---|---|---|---|
| 3,357,756 | 12/1967 | Fehr | 310/90.5 |
| 3,698,775 | 10/1972 | Gilbert | 310/90.5 |
| 4,683,111 | 7/1987 | Helm et al. | 384/446 |
| 4,735,262 | 4/1988 | Lucas | 384/900 |
| 4,810,918 | 3/1989 | Kachuk | 310/90 |
| 4,848,934 | 7/1989 | Blakely et al. | 384/913 |

FOREIGN PATENT DOCUMENTS

| | | | |
|---|---|---|---|
| 135616 | 6/1988 | Japan | 384/913 |
| 2033977 | 5/1980 | United Kingdom | |
| 2048195 | 12/1980 | United Kingdom | |

*Primary Examiner*—Steven L. Stephan
*Assistant Examiner*—D. L. Rebsch
*Attorney, Agent, or Firm*—Nixon & Vanderhye

[57] ABSTRACT

An assembly in which a rotating shaft is supported by a magnetic bearing has a back-up bearing to support the shaft in the event of failure of the magnetic bearing, the back-up bearing comprising a first layer of a dry bearing material, and with a surface opposite to a wear-resistant surface portion of a second layer. One layer is provided on a stationary part of the assembly, such as a housing, and the other layer is provided on the shaft. When the coefficient of friction between the first and second layers is either relatively low, or relatively high, heat can be dissipated from the back-up bearing at a low rate; or at a high rate. Heat dissipation may be enhanced by providing fins in good thermal contact with at least one of the two layers of the back-up bearing; and each such layer, advantageously, has a high thermal conductivity.

9 Claims, 1 Drawing Sheet

HIGH-FRICTION BACK-UP BEARING FOR MAGNETIC BEARINGS

This invention relates to an assembly in which a rotating shaft is to be supported by a magnetic bearing, but is to be supported by a back-up bearing in the event of failure of the magnetic bearing. A magnetic bearing may be provided for a shaft having high rotational energy, and it is especially important in such a case to provide a satisfactory back-up bearing for the the shaft.

The back-up bearing is required to be of a form to support the shaft in a satisfactory manner, and to enable the shaft to be brought to rest after any failure in the operation of the associated magnetic bearing. While the shaft is being brought to rest it is required that the shaft, any part of assembly rotating with the shaft, and the back-up bearings do not become damaged or worn.

The shaft is brought to rest by the rotational energy of the shaft being absorbed by, and then dissipated in the form of heat from, the back-up bearing; and/or by the rotational energy of the shaft being absorbed by the system driving the shaft doing work. If a substantial amount of the rotational energy of the shaft is to be absorbed by the back-up bearing, there is to be a relatively high coefficient of friction associated with the back-up bearing. Alternatively, if a substantial amount of the rotational energy of the shaft is to be absorbed by the system driving the shaft, there is to be a relatively low coefficient of friction associated with the back-up bearing.

If the shaft is to be brought to rest in a short period the rate of absorption of the rotational energy of the shaft by the back-up bearing, and/or by the drive system for the shaft, is required to be high.

It is known to have a back-up bearing with rolling elements, for example, the back-up bearing comprising a ball race, possibly without the provision of any form of lubrication. Any such construction for a back-up bearing having rolling elements has a low coefficient of friction associated therewith, say on the order of 0.001. The ball race may be required to run beyond its design speed limit after any failure of the magnetic bearing. Further, the ball race may have suffered damage due to rotation of the shaft causing fretting, before any failure of the magnetic bearing. Thus, after any failure of the magnetic bearing it is common for the ball race to fail during run down of the shaft, which is clearly undesirable, and causes the requirement that the ball race is to be replaced before the magnetic bearing can be used again.

Bearings are known which includes a layer of a dry bearing material. Such bearings usually fail by seizure of otherwise relatively rotating, constituent parts of the bearing, due to high temperatures being generated within the bearing. Such high temperatures are generated because the rate of absorption of energy thereby is greater than the rate of dissipation of heat therefrom. It will be understood that the rate of dissipation of heat varies with the temperature of the bearing, and the bearing fails when, with the temperature at the value at which the constituent parts of the bearing seize by being mechanically welded together, the rate of absorption of energy is greater than the rate of dissipation of heat. For convenience, hereinafter in this specification, and the accompanying claims, the term dry bearing material is used to refer to a known composition of a dry layer suitable to be included in a bearing. In particular, the layer is required to provide a surface which is less likely than otherwise would be the case, to become seized with, by becoming mechanically welded to, the surface of a co-operating part rotating relative to the layer.

Thus, it is an object of the present invention to provide a back-up bearing for an assembly in which a rotating shaft is to be supported by a magnetic bearing, the back-up bearing having a construction such that is has a reduced tendency to be damaged, or worn, either when the associated magnetic bearing is operating normally, or when the shaft is being brought to rest in the event of failure of the magnetic bearing, compared with known back-up bearings having rolling elements.

In accordance with the present invention an assembly in which a rotating shaft is to be supported by a magnetic bearing including a back-up bearing to support the shaft when the magnetic bearing fails, the back-up bearing having a first part comprising a cylindrically-shaped layer of a dry bearing material, and with a surface opposite to a wear-resistant surface portion of a second part of the back-up bearing, one such part being provided on the shaft, and the other part is provided on a stationary part of the assembly, wherein the coefficient of friction between the first and second parts is relatively high, and a remaining portion of the second part and contiguous with the wear-resistant surface portion thereof and is of a material with a high-coefficient of thermal conductivity, and in the operation of the assembly, the clearance between the opposing surfaces of the back-up bearing is arranged to be less than the clearance between the rotating shaft and the magnetic bearing.

Usually, the second part of the back-up bearing is provided on the cylindrical part of the shaft; but if the shaft is not to rotate at a high speed, instead, the first part may be provided on the cylindrical part of the shaft.

Such an assembly is advantageous in that the back-up bearing does not become damaged, or worn, inadvertently during the normal operation of the magnetic bearing.

Further, the back-up bearing easily can be arranged so that the back-up bearing, the shaft, and any part of the assembly rotating with the shaft, do not become damaged or worn, while the shaft is being brought to rest after any failure of the magnetic bearing. In particular, the first and second parts of the back-up bearing are selected such that there is a required coefficient of friction therebetween.

Inevitably, the coefficient of friction associated with any form of back-up bearing in accordance with the present invention is at least one order of magnitude, and possibly two orders of magnitude, greater than that of any known form of back-up bearing including rolling elements.

Also for convenience in this specification, and the accompanying claims, reference is made to the coefficient of friction between the first and second parts of the back-up bearing being relatively low when it is less than 0.2 and reference is made to this coefficient of friction being relatively high when it is greater than 0.2.

If the heat can be dissipated from the back-up bearing at a relatively high rate, the coefficient of friction between the first and second parts can be relatively high without the shaft and the back-up bearing's becoming seized together, or becoming significantly worn. Hence, the first part may comprise a textile material, say, of asbestos or glass fibre, impregnated with a phenolic resin.

The wear-resistant surface portion of the second part is contiguous with a remaining portion of the second part. The rate at which heat can be dissipated from the back-up bearing is determined partially by the coefficient of thermal conductivity of the remaining portion of the second part. Conveniently, so that there is a high rate of dissipation of heat from the back-up bearing, the remaining portion of the second part has a high coefficient of thermal conductivity, and comprises a heat sink.

Conveniently, the stationary part of the assembly, with a part of the back-up bearing provided thereon, comprises a housing of the assembly.

The rate at which heat can be dissipated from the back-up bearing can be enhanced by the provision of fins in good thermal contact with the first part, or the second part, of the back-up bearing. Desirably, fins are mounted to rotate with the shaft. The part of the back-up bearing in good thermal contact with the fins, advantageously, has a high coefficient of thermal conductivity.

When a housing is provided for the assembly, the fins may be arranged to be external of the housing.

The present invention will now be described by way of example with reference to the accompanying drawings.

DETAILED DESCRIPTION OF THE DRAWINGS

Figure 1:
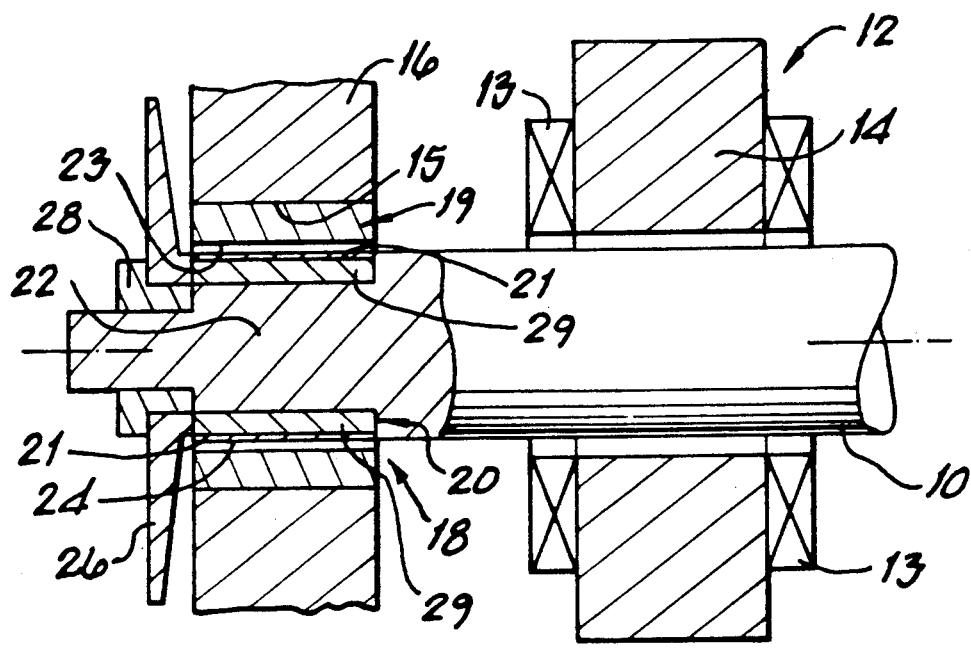
FIG. 1 comprises a side elevation, partially sectioned, of one embodiment of an assembly in accordance with the present invention, showing a rotating shaft mounted within a magnetic bearing, and there being provided a back-up bearing, and FIG. 2 corresponds to FIG. 1, but is of an alternative embodiment of an assembly in accordance with the present invention.

As shown in FIG. 1 of the accompanying drawing, an assembly includes a rotating shaft 10 mounted within a conventional magnetic bearing, indicated generally at 12. The electromagnet of the magnetic bearing has two coils 13, and a ferromagnetic core 14.

Only one end of the shaft 10 is illustrated, and this end protrudes through an aperture 15 in a part of a housing 16 for the assembly, only this part of the housing being shown. Within the aperture 15 in the housing 16 is provided a back-up bearing for the assembly, the back-up bearing being indicated at 18.

In accordance with the present invention, the back-up bearing 18 has a cylindrically-shaped first layer 19, secured to the housing 16 by being an interference fit within the aperture 15; and a cylindrically shaped second layer 20, secured to the shaft 10.

One of the first layer 19, and the second layer 20, is of a dry bearing material; and the other has a wear-resistant surface portion 21. In FIG. 1, the wear-resistant surface portion 21 is provided on the second layer 20; and the second layer is secured to the shaft 10 by being a press fit on a reduced diameter cylindrical part 22 of the shaft 10. The radially inner surface 23 of the layer 19 is opposite to the radially outer surface 24 provided by the wear-resistant surface portion 21 of the layer 20.

In one example of the assembly, and with the assembly in operation, the clearance between the magnetic bearing 12 and the shaft 10 is 0.5 millimeter; and the clearance between the opposing surfaces 23 and 24 of the back-up bearing 18 is 0.25 millimeter.

It is required that the shaft 10 is brought to rest after any failure in the operation of the magnetic bearing 12, and before the shaft, and any part of the assembly rotating with the shaft, becomes damaged, or worn. In particular, it is required that the shaft and the back-up bearing 18 do not become seized, or significantly worn, because of temperature rises within the back-up bearing, and of the shaft.

Heat is dissipated from the back-up bearing by conduction of the heat to the shaft 10; to any part of the assembly secured to the shaft; and to the stationary part 16 on which the layer 19 of the back-up bearing 18 is provided. Further, at least the layer 20 of the back-up bearing 18 also comprises a heat sink, having a high coefficient of thermal conductivity. Usually the shaft 10 has a high coefficient of thermal conductivity.

If the arrangement is such that heat can be dissipated from the back-up bearing at a high rate before the back-up bearing 18 and the shaft become seized together, the coefficient of friction between the layers 19 and 20 may be relatively high. Consequently, the shaft 10 may take only a short time to be brought to rest. It is required to ensure that the rate of conversion of the energy of the rotating shaft to heat within the back-up bearing is less than the rate of dissipation of heat from the back-up bearing at temperatures below those at which seizure, or significant wear or damage, of the assembly parts occurs.

As also is shown in FIG. 1, drawing, the rate of dissipation of heat may be enhanced by the provision of fins 26 in good thermal contact with the layer 20 of the back-up bearing 18 provided on the shaft 10. The fins 26 rotate with the shaft 10; the layer 20 is of a material with a high coefficient of thermal conductivity, greater than 0.90 calories per sec cm °C.; and the fins are external of the housing 16 of the assembly. The fins 26 are shown clamped to be contiguous with the layer 20 by a locking member 28 secured to the end of the shaft 10.

In one particular assembly in accordance with the present invention the shaft is of steel. The layer 19 of the back-up bearing 18 is of a textile material, say, of asbestos or glass fiber, impregnated with a phenolic resin. The layer 20 of the back-up bearing 18 has a wear-resistant surface portion 21 of hard chromium plated onto the remaining portion 29 of the layer; and the remaining portion of the layer comprises an alloy of copper and chromium, having a Vickers hardness value of 130, and having a thermal conductivity of 0.95 calories per sec cm °C. There is a relatively high coefficient of friction between the layers 19 and 20. The fins 26 are of an alloy of copper and chromium, having sufficient strength to withstand the rotational stresses at high speed, to which the fins are expected to be subjected.

It is always desirable that these layers have surface portions which are less likely to become seized together, by becoming mechanically welded to each other, at temperatures expected to be generated in the operation of the back-up bearing.

Figure 2:
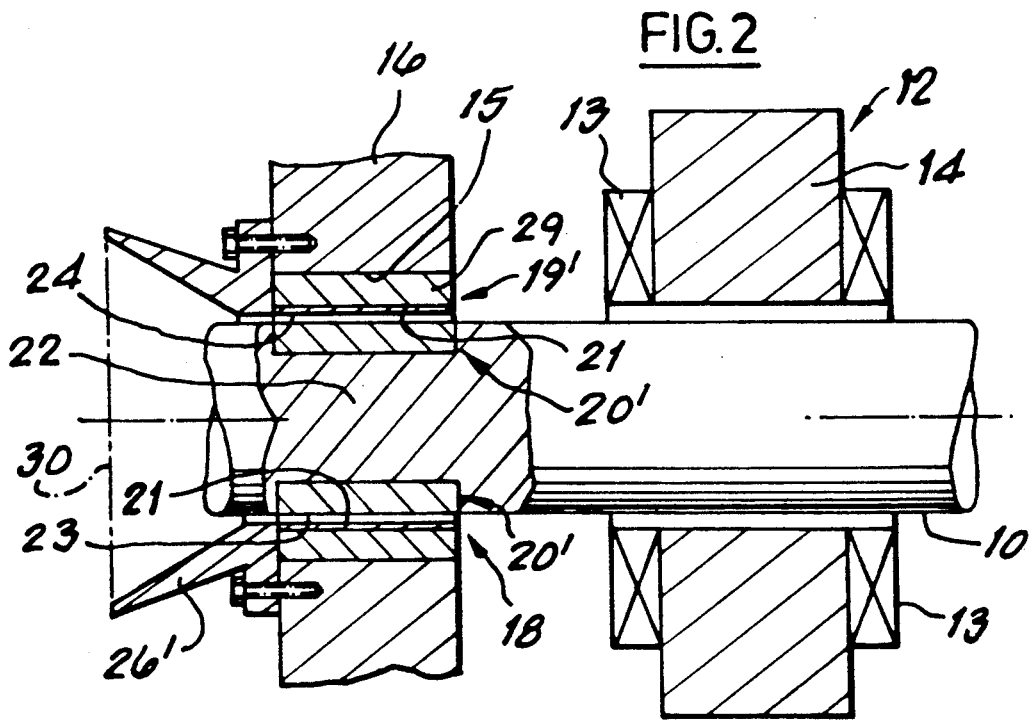

In the assembly shown in FIG. 2 parts identical to, or closely resembling, parts of the assembly of FIG. 1 are identified by the same referance numerals in both Figures.

As shown in FIG. 2 the layer of the back-up bearing having the wear-resistant surface portion 21 is provided on the remaining portion 29 of the first layer $19^1$ secured to the stationary part 16 of the assembly, because the shaft 10 is not to rotate at high speeds. The second layer $20^1$, secured to the shaft, is of a dry bearing material.

Stationary fins 26¹ are provided to be in contact with the stationary layer 19¹ of the back up bearing. The fins 26¹ may have any convenient form, and are indicated in general by the broken line 30. The fins 26¹ are secured to the stationary part 16 of the assembly by being bolted thereto.

The stationary part 16 of the assembly may not comprise a housing.

I claim:

1. An assembly in which a rotating shaft is to be supported by a magnetic bearing including a back-up bearing to support the shaft when the magnetic bearing fails, the back-up bearing having a first part comprising a cylindrically-shaped layer of a dry bearing material, and with a surface opposite to a wear-resistant surface portion of a second part of the back-up bearing, one such part being provided on the shaft, and the other part being provided on a stationary part of the assembly, wherein the coefficient of friction between the first and second parts is relatively high, and a remaining portion of the second part being contiguous with the wear-resistant surface portion thereof and being of a material with a high coefficient of thermal conductivity, and in the operation of the assembly, the clearance between the opposing surfaces of the back-up bearing being arranged to be less than the clearance between the rotating shaft and the magnetic bearing.

2. An assembly as claimed in claim 1, in which the second part of the back-up bearing is provided on the shaft.

3. An assembly as claimed in claim 1, in which the first part comprises a textile material impregnated with a phenolic resin.

4. An assembly as claimed in claim 1, in which the wear-resistant surface portion of the second part of the back-up bearing is of hard chromium plated onto the remaining portion of the second part.

5. An assembly as claimed in claim 1, in which the remaining portion of the second part is of an alloy of chromium and copper.

6. An assembly as claimed in claim 1, in which the stationary part of the assembly, with a part of the back-up bearing provided thereon, comprises a housing of the assembly.

7. An assembly in which a rotating shaft is to be supported by a magnetic bearing including a back-up bearing to support the shaft when the magnetic bearing fails, the back-up bearing having a first part comprising a cylindrically-shaped layer of a dry bearing material, and with a surface opposite to a wear-resistant surface portion of a second part of the back-up bearing, one such part being provided on the shaft, and the other part being provided on a stationary part of the assembly, the clearance between the opposing surfaces of the back-up bearing being arranged to be less than the clearance between the rotating shaft and the magnetic bearing, the coefficient of friction between the first and second layers being relatively high, and fins being provided in good thermal contact with said second part of the back-up bearing.

8. An assembly as claimed in claim 7, in which fins are mounted to rotate with the shaft.

9. An assembly as claimed in claim 7, in which a housing is provided for the assembly, and the fins are arranged to be external of the housing of the assembly.

* * * * *